(12) United States Patent
Helms et al.

(10) Patent No.: US 7,099,059 B1
(45) Date of Patent: Aug. 29, 2006

(54) DUAL MODE COLLIMATED COMMUNICATIONS TRANSCEIVER

(75) Inventors: Richard Morgan Helms, Sunderland (CA); John V. Taglione, Scarboro (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/998,184

(22) Filed: Dec. 24, 1997

(30) Foreign Application Priority Data

Dec. 24, 1996 (CA) ............................................. 2194024

(51) Int. Cl.
*H04B 10/00* (2006.01)
*H04B 10/10* (2006.01)
*H04B 10/30* (2006.01)

(52) U.S. Cl. ........................................ 359/159; 359/180
(58) Field of Classification Search ................ 359/150, 359/159, 181
See application file for complete search history.

(56) References Cited

U.S. PATENT DOCUMENTS

| | | | | |
|---|---|---|---|---|
| 4,882,772 A | * | 11/1989 | Rist | 455/617 |
| 5,136,136 A | * | 8/1992 | Karube | 219/121.73 |
| 5,142,400 A | * | 8/1992 | Solinsky | 359/159 |
| 5,307,210 A | * | 4/1994 | Macfarlane | 359/859 |
| 5,323,257 A | * | 6/1994 | Abe et al. | 359/159 |
| 5,347,387 A | * | 9/1994 | Rice | 359/152 |
| 5,390,040 A | * | 2/1995 | Mayeux | 359/152 |
| 5,465,170 A | * | 11/1995 | Armito | 359/159 |
| 5,532,858 A | * | 7/1996 | Hirohashi | 359/159 |
| 5,808,769 A | * | 9/1998 | Kerklaan | 359/180 |
| 5,811,828 A | * | 9/1998 | Laser | 250/566 |
| 5,822,101 A | * | 10/1998 | Deguchi | 359/172 |
| 6,031,946 A | * | 2/2000 | Bergmann | 385/18 |

\* cited by examiner

*Primary Examiner*—Jason Chan
*Assistant Examiner*—Agustin Bello
(74) *Attorney, Agent, or Firm*—Douglas W. Cameron; Anne Vachon Dougherty

(57) ABSTRACT

The invention provides an optical communications system having a dual mode of operation. It includes a communications module having an optically active portion with a wide-angle view; a light collimator; and a connector connecting the communications module and the light collimator to permit the module and collimator to be selectively positioned in a collimated or non-collimated position. When it is the collimated position, the communications module is positioned at the focal point of the collimator, and when in a non-collimated position the communications module is positioned away from focal point of the collimator; so that the communications system has a narrow field of view when operated in the collimated position, and has a wide field of view when operated in the non-collimated position.

18 Claims, 2 Drawing Sheets

DUAL MODE COLLIMATED COMMUNICATIONS TRANSCEIVER

FIELD OF THE INVENTION

This invention relates to light or infrared transceivers which are capable in operating in different configurations including collimated and wide angle modes of operation.

BACKGROUND OF THE INVENTION

In order to secure increase flexibility, data processing systems have migrated to LAN (Local Area Network) communication systems so that individual computer workstations can be connected to data servers, printers, and other facilities. Up until recently, most of these LAN systems have been wired so that when a user wished to connect to the LAN the user must secure a physical or wired connection to the LAN in order to participate in communications on the LAN.

In order to secure a more flexible system to dispense with wiring and permit a flexible arrangement in which workstations or other devices (which we will collectively call nodes), could be added to or removed from wireless LANs were developed. The most convenient way that has been found to operate successfully is by means of light communication, particularly using infrared wavelengths of light, to communicate between the various nodes in an infrared LAN system.

As is well known in the art at the present time, each of the nodes in such a LAN system would have associated with it (and likely built into it) an infrared transceiver, typically complying with the IrDA Association standards. This transceiver typically achieves communications by using an LED (Light Emitting Diode as an infrared emitter). In accordance with the standards of the IrDA Association, the pattern of infrared light emitted is typically in the form of a cone of light of about 60° angle. This provides effective communication over a short range with relatively low sensitivity to the positioning of the direction of the transceiver, emitter or receiving device. However, as will be well recognized, the range of communications is limited by the amount of power which can be emitted by the emitter. As this light is spread out as it is emitted, the power density available at a given distance will follow the inverse square law. This limits the distance over which data transmission can occur as the power density will fall off beyond the density required for effective transmission when communicating nodes are separated by excessive distance.

If increased range is desired, the amount of light energy emitted by the LED could possibly be increased; however, this will be limited by the nature of the LED employed and by maximum safe limitations imposed by government or safety regulations to protect users from excessive exposure to infrared light Alternatively, it is possible to extend the range of a transceiver by collimating or focusing the light to constrain it into a narrow beam. However devices which use light for communication are constrained by the requirement that each node of the system included in the LAN must be in the light path involved. This would typically preclude more than two devices from communicating using a collimated beam unless all devices or nodes in the LAN were lined up with the beam or a mirror system was used to reflect the beams used to the different nodes, all of which is unnecessarily complex for simple operation.

Accordingly, in order to achieve the advantages of both a divergent pattern of infrared light transmission which would permit significant flexibility in the arrangement of nodes in the LAN and also to make available the use of collimated light for longer distant communications it would be desirable to have a system or device which would be capable of operating in both of these modes presenting the capabilities of switching from a collimated to a non-collimated mode as required.

The present invention provides a simple, efficient system in which a transceiver is provided that has a dual mode of operation; collimated, and non-collimated.

SUMMARY OF THE INVENTION

The present invention provides an optical communications system having a dual mode of operation. This system includes a communications module having an optically active portion with a wide angle of view and a light collimator which preferably comprises an off access parabolic mirror. The communications module and light collimator are flexibly connected together preferably by a link arm which permits the module a collimator to be selectively positioned in two positions, a collimated, or non-collimated position. When the system is in the collimated position, the communications module is positioned at the focus of the collimator. When the system is in the non-collimated position, the communications module is positioned away from the focal point of the collimator. As a result when the system is in it's collimated position the communication system has a narrow field of view that permits longer range communication It has a wide field of view when operated in an non-collimated position.

Advantageously the optically active portion of the communications module will include a light emitter (in the case of an infrared communication system this would be in an infrared emitter such as an infrared LED) and for compactness will also include a light responsive element such as a photosensor (in the case of infrared communications this would preferably be a solid state infrared sensor). In this embodiment the communication module is a transceiver as it has both send and receive capabilities. When the communication module is placed in the collimated position its optically active portion (ie. its emitter and sensor) is placed in the focus of the collimator.

When the system is in the collimated position, the light or infrared emitting device such as an LED will have it's normally wide angle cone of light focused by the mirror into a collimated beam of light which is preferably oriented horizontally to permit long distance communications in the normal place of operation of a commercial enterprise such as an office. Conversely, any light communications which are within the field of view of the mirror will be focused on the receiving element (sensor) in the optically active portion of the communications module likewise permitting longer distance operation than when used in the non-collimated position, as it will have a narrower field of view.

When in the non-collimated position, the optically active portion of the communications module will emit light in a wide cone as determined by the characteristics of the light emitter of the system and as well will permit reception of light over a wide cone of operation again as determined by the characteristics of the light receiving or sensitive portion of the communications module.

DESCRIPTION OF THE PREFERRED EMBODIMENT

Figure 1:
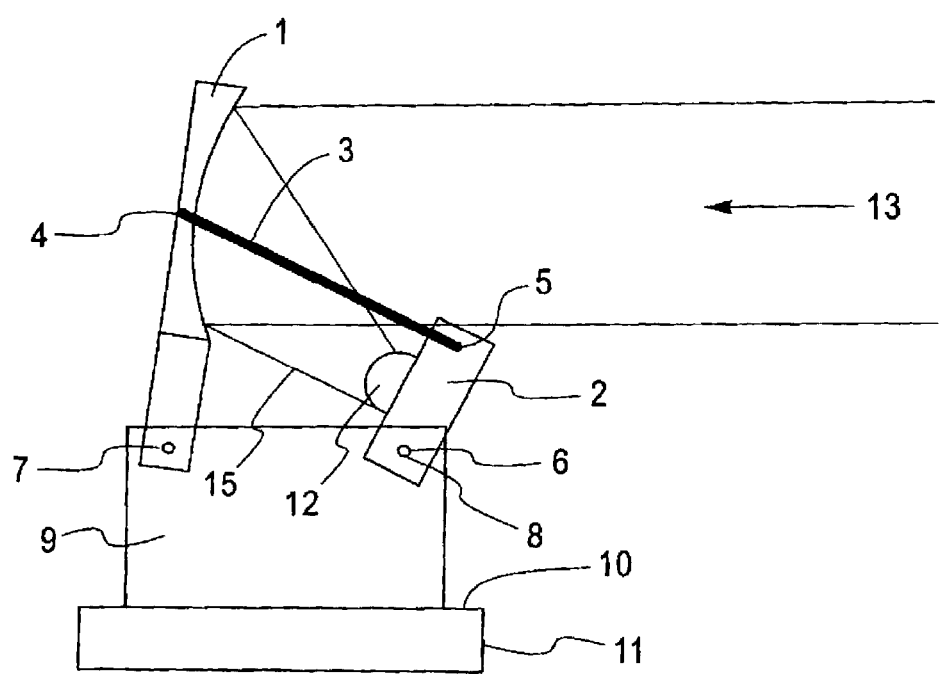
FIG. 1 illustrates a side view of one embodiment of the present invention in its collimated or narrow angle mode of operation.

FIG. 1 illustrates an embodiment of the invention in the collimated or narrow angle mode of operation. The collimator, an off-access parabolic minor 1 which is in a substantially upright position indicated in this figure focuses light emitted from the optically active area 12 of communications module 2 which is positioned at the mirror focal point 15 into a collimated beam (or narrow) of light 13 for transmission substantially horizontally to another optically active system, such as a receiver or a data processing computer system. The most prevalent system in use for light communication is infrared light. For this purpose the optically active area 12 of the communications module 2 would preferably include an infrared LED (which is commonly available and needs no further description). The LED chosen would preferably conform to accepted commercial and safety standards and comply with the IrDA association requirements to assure compatibility with communications with other data processing devices complying with the IrDA standards.

Those familiar with the infrared data communications field are undoubtedly familiar with the IrDA Association.

As can be seen, the mirror 1 is connected by a link arm 3 at pivot 4 on the side of the mirror to the communications module 2 at pivot 5. Pivot 5 will be referred to as the far pivot of the communications module 2, as it can be seen that when the communications module is positioned in a horizontal position with its optically active area 12 position upright, pivot 5 is spaced substantially away from mirror 1.

Mirror 1 is also attached by a pivot at one side 7 near its bottom to a projection 9 projecting above from the base 10 of the common support 11.

The communication module is pivotly attached at its side by pivot 6 to pivot 8 of projection 9 of the common support 11. In the preferred embodiment it would include in the optically active area an infrared emitting LED and an infrared responsive solid state sensor element.

It will be understood that when the system is in its collimated position, light or infrared light received from some distance, within the field of view of mirror 1 will be focused on the optically active area 12 of module 2 and correspondingly light carrying data received by the sensor and generating an electrical signal can be processed by the communications module for use in data processing.

The actual processing of received data and the emitting of light will not be further discussed with herein as the operation of these devices will be well understood by those familiar in the art to which it relates.

As will be appreciated, the collimated position of the invention permits the operation of the system for distant communications. However, while this is suitable for distant communication, the narrow field of view obtained may pose limitations when communications with a number of devices positioned relatively closely is desired. In this case, a wide angle of view is desirable so that light being received from various angles within the wide angle can be accepted and processed and conversely light intended to be transmitted in a wide direction of view can also be achieved.

Figure 2:
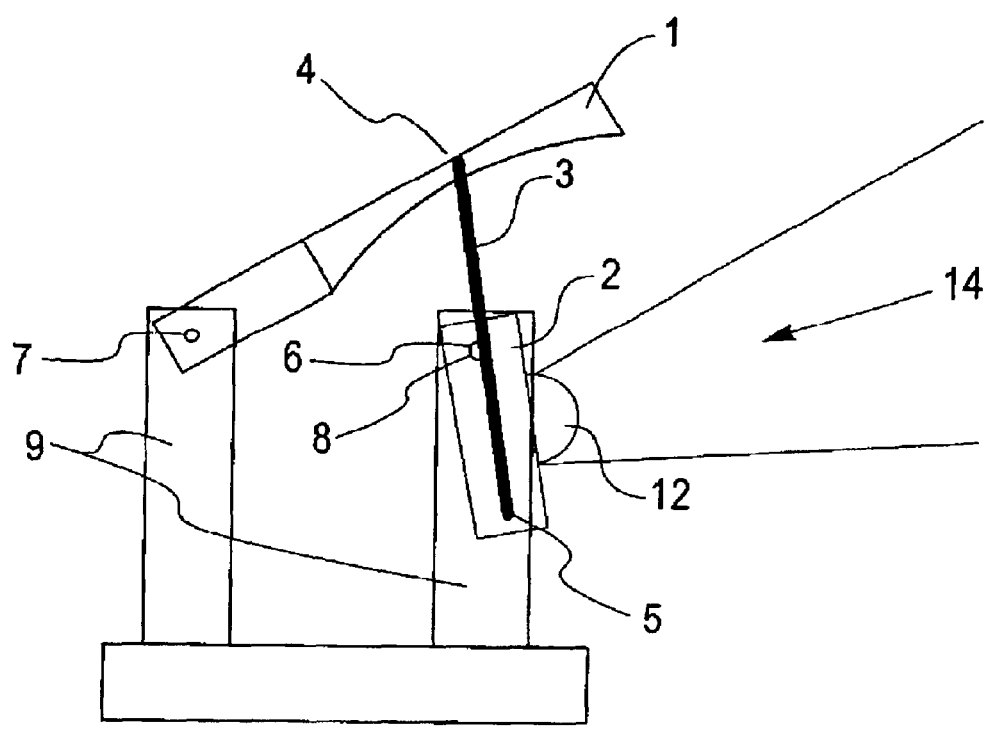
FIG. 2 illustrates a embodiment of the present invention in a non-collimated position in which the optically active portion of the communications module can send or receive light over a wide angle of view.

Referring to FIG. 2 the illustrated embodiment of the invention is shown in a non-collimated position. This has been achieved by rotating the mirror 1 downwardly or conversely by rotating the communications module 2, which, as will be appreciated, results in motion of the mirror 1, as well, by the action of link 3. Assuming for the moment that the user desires to change the system from collimated to non-collimated operation, the user would typically push on mirror 1 to rotate it downwardly. Link 3 acting pivotly on communications module 2 would cause a rotation of the module 2 away from the mirror 1 rotating the field of view of the optically active portion 12 to rotate away from the mirror and thus give a clear wide angle field of view 14 as shown in FIG. 2.

While FIG. 2 shows the communications module 5 in a particular non-collimated direction, it will be well appreciated that there is a substantial range of positioning that will expose the optically active element 12 to permit a wide field of view.

As can be well appreciated, this is achieved by the cooperative action of the various pivot points 6, 7, 8, 5 and 4 cooperating to achieve the positional adjustment.

It will be well appreciated that one or two parallel link arms 3 could be used; one attached pivotly to each side of the mirror with their corresponding other ends pivotly attached to the corresponding far points of the communications module. Likewise, the said projections 9 could comprise two sets of projections 9 as shown in FIG. 2, one set on each side of the mirror and communications module. The pivot 7 and 8 could alternatively be provided by pivots in the single vertical support 9 shown in FIG. 1 as might be well appreciated instead of the projections 9 illustrated in FIG. 1.

In addition, suitable movement of the mirror and comminations module can be obtained through pivot and sliding mechanisms as will be appreciated having had the opportunity of viewing this embodiment. These have not been shown.

In addition, should it be desirable to provide for fixation of the system in the collimated and non-collimated positions pivot stops or detents could be used. These will also not be discussed further as those familiar with the mechanical arts could achieve locking, latching or stop mechanisms in various manners.

The present invention is to be limited only in accordance with the scope of the appended claims since persons skilled in the art may devise other embodiments still within the limit of the claims.

The embodiments of the invention in which an exclusive property or privilege is claimed are defined as follows:

1. An optical communications system having a dual mode of operation comprising:
    a) a communications module having an optically active portion with a wide-angle view;
    b) a light collimator;
    c) connecting means connecting said communications module and said light collimator to permit said module and collimator to be selectively positioned in a collimated or non-collimated position, said connecting means comprising a mechanical link moveably attached to said communications module and to said light collimator;
        when in said collimated position said communications module being positioned at the focus of said collimator;
        when in said non-collimated position said communications module being positioned away from said focus of said collimator;
            whereby said communications system has a narrow field of view when operated in said collimated position, and whereby said communications system has a wide field of view when operated in said non-collimated position.

2. The communications system of claim 1 wherein said connecting means comprises a mechanical link pivotly attached to said communications module and to said light collimator.

3. The optical communication system of claim 1 wherein said collimator comprises a mirror.

4. The communications system of claim 1 wherein said optically active portion comprises a light emitting means which is positioned at the focus of said mirror when said module is in said collimated position.

5. The system of claim 1, wherein said optically active portion comprises light sensitive means which is positioned at the focus of said mirror when said module is in said collimated position.

6. The system of claim 1 wherein said mechanical link is pivotly attached to said communications module and to said light collimator;
   said system further including a common support to which said collimator and communications module are moveably connected.

7. The system of claim 6 wherein said common support comprises:
   a base and attachment means disposed in spaced relation above said base for attachment of collimator and module.

8. The system of claim 7 wherein said attachment means comprises a set of spaced pivotal attachment means on a projection of said base.

9. The system of claim 8 wherein said pivotal attachment means comprises a pair of horizontally spaced vertical projections each having a pivot attachment.

10. The system of claim 8 wherein said collimator and communications module are pivotally attached at their sides to said base pivots and to said link.

11. The system of claim 10 wherein said collimator comprises a mirror and said mirror is attached pivotally at its lower portion of one side to a pivot of said base;
   said communications module having near and far pivots;
   said communications module being connected to said far base pivot at its near pivot and to one end of said link arm at said far pivot;
   the other end of said link arm being connected intermediately of a corresponding side of said mirror;
   whereby when said mirror is moved to a substantially upright position comprising said collimated position said communication module will be pivoted into position substantially at the focus of said mirror;
   whereby said system will have a narrow field of view and be capable of emitting collimated light;
   and when said mirror is rotated downwardly, said communications module will correspondingly be rotated away from said mirror permitting it to have a wider field of view.

12. The system of claim 11 wherein said base includes two space sets of pivot points;
   said mirror and communications module being pivotally attached between two sets of pivots.

13. The system of claim 1, 4 or 5 wherein said optically active portion comprises a light transceiver.

14. The system of claim 13 wherein said optical communications system is adapted to use infrared light and said optically active portion is adapted to use infrared light in which light emitting means therein is adapted to emit infrared light and light sensitive means is adapted to respond to infrared light.

15. An optical communications system having a dual mode of operation comprising:
   a) a communications module having an optically active portion with a wide-angle view;
   b) a light collimator, wherein said collimator comprises a parabolic mirror;
   c) connecting means connecting said communications module and said light collimator to permit said module and collimator to be selectively positioned in a collimated or non-collimated position;
      when in said collimated position said communications module being positioned at the focus of said collimator;
      when in said non-collimated position said communications module being positioned away from said focus of said collimator;
      whereby said communications system has a narrow field of view when operated in said collimated position, and
      whereby said communications system has a wide field of view when operated in said non-collimated position.

16. A communications system having a dual mode of operation comprising:
   a) a communications module having an optically active portion with a wide-angle view;
   b) a light collimator, wherein said collimator comprises an off axis parabolic mirror;
   c) connecting means connecting said communications module and said light collimator to permit said module and collimator to be selectively positioned in a collimated or non-collimated position;
      when in said collimated position said communications module being positioned at the focus of said collimator;
      when in said non-collimated position said communications module being positioned away from said focus of said collimator;
      whereby said communications system has a narrow field of view when operated in said collimated position, and
      whereby said communications system has a wide field of view when operated in said non-collimated position.

17. The system of claim 16 wherein said light emitting means comprises an infrared emitter.

18. The system of claim 17 wherein said light emitting means comprises an LED.

\* \* \* \* \*